July 26, 1955     O. W. GREENE     2,714,024
APPARATUS FOR LUBRICATING AND SEALING A STUFFING BOX
Filed April 1, 1949     3 Sheets-Sheet 3
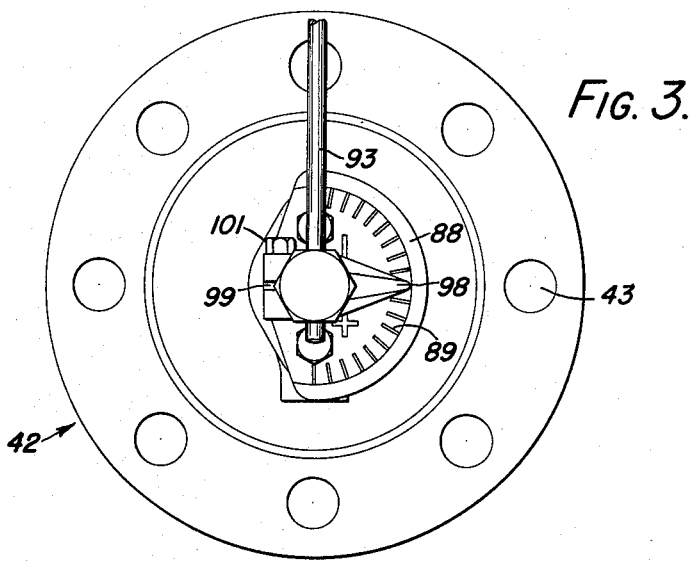
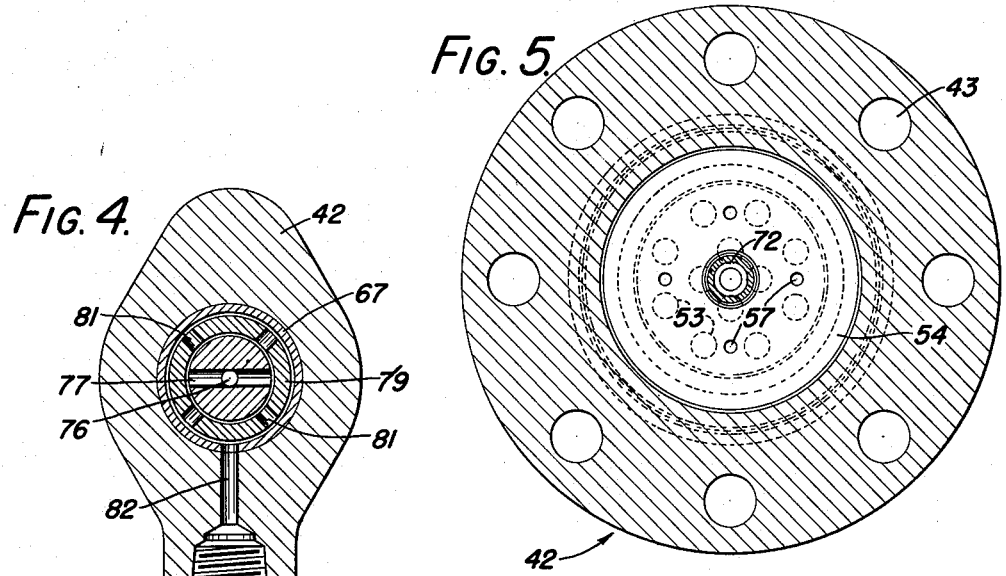
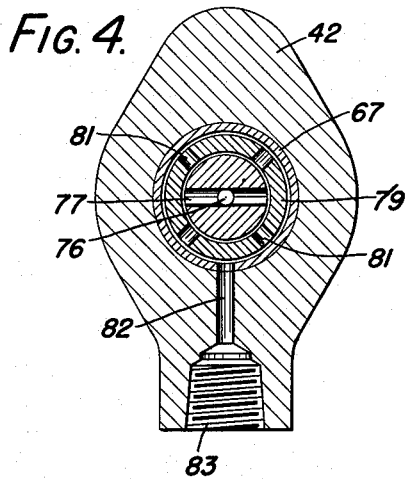
INVENTOR.
OTTO W. GREENE
BY
ATTORNEY

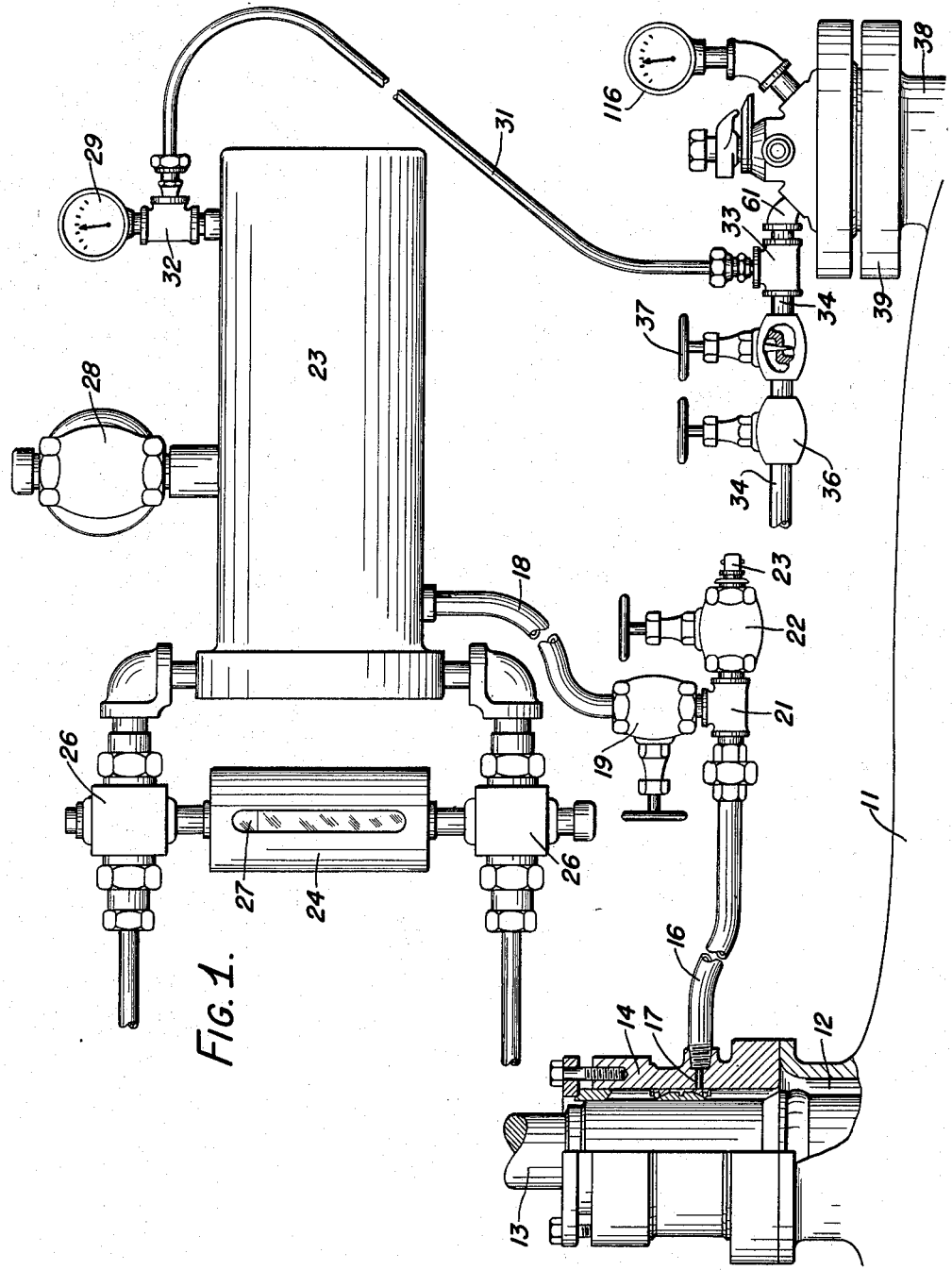

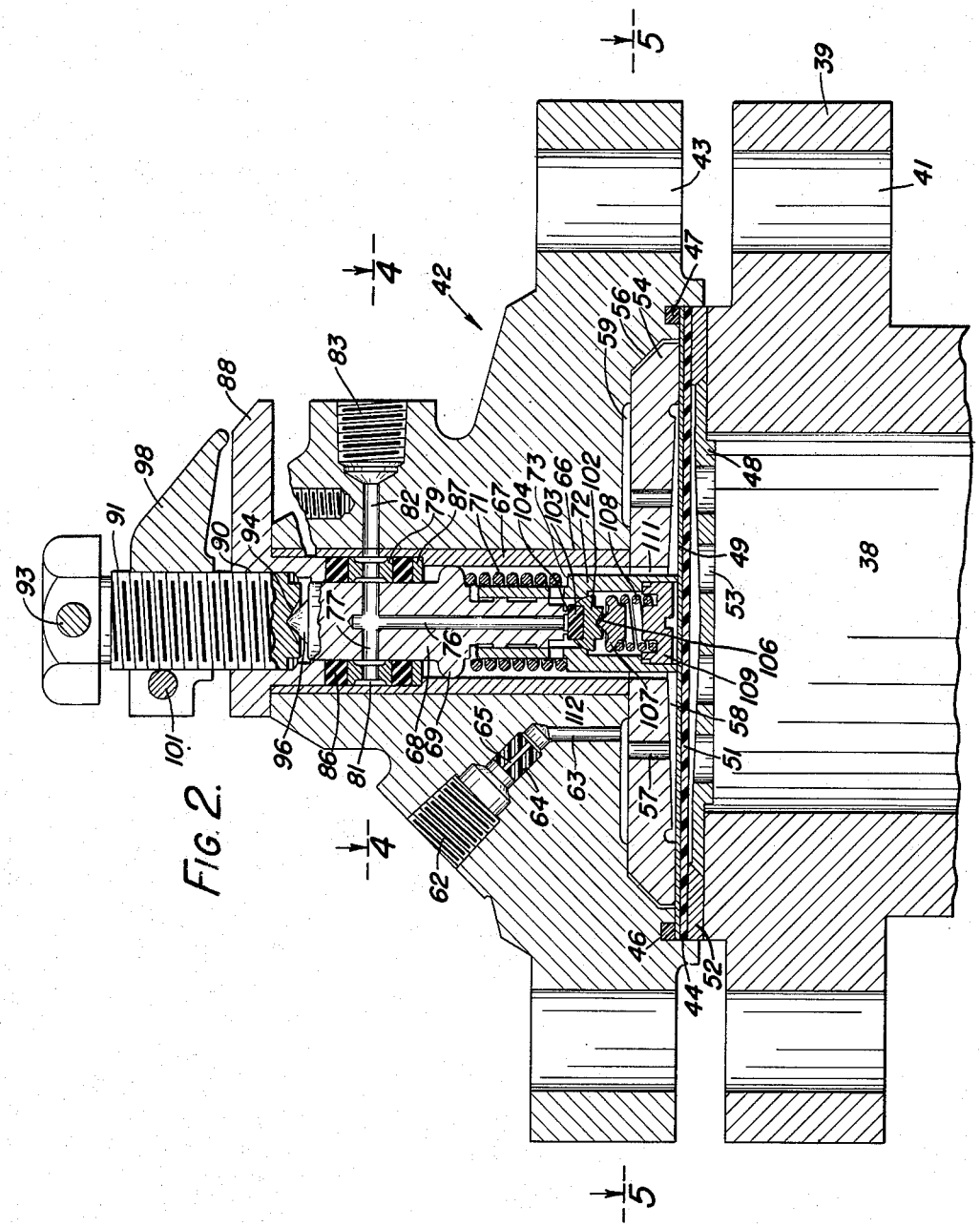

United States Patent Office 2,714,024
Patented July 26, 1955

2,714,024

APPARATUS FOR LUBRICATING AND SEALING A STUFFING BOX

Otto W. Greene, Rochester, N. Y., assignor to The Pfaudler Company, a corporation of New York Application April 1, 1949, Serial No. 84,908

13 Claims. (Cl. 286—9)

My invention relates to a counterbalance valve and method and apparatus for lubricating and sealing the stuffing box which extends around the shaft of an agitator employed in connection with a high pressure reactor.

One of the problems in connection with the operation of reactors is to secure an accurate reflection of the pressure within the reactor without subjecting the reflecting mechanism to the corrosive action of the chemicals being processed and which will accurately reflect that pressure through wide variations in pressure. The pressure within the reactor when accurately duplicated in a mechanism sealed with respect to the chemicals within the reactor may be employed to operate automatic pressure devices for controlling the supply of steam to the reactor, the supply of cooling water thereto, the operation of pressure relief devices, the control of process sequences or the operation of a pressure device which must or may be operated in accordance with the pressure existing within the reactor.

One of the uses of such a counterbalance valve or pressure reflecting apparatus is in connection with the lubrication of the stuffing box for the shaft of an agitator employed in connection with a reactor. The liquids or gases in the reactor being processed are often corrosive, noxious or otherwise harmful if they escape into the room in which the reactor is located. While in some cases mechanical seals have been successfully employed, they are not reliable in use under all circumstances. When an accurate reflection of the pressure within the reactor can be obtained that pressure can be modified to obtain an overpressure to lubricate the stuffing box and seal it against the escape of noxious gases from the reactor.

An object of my invention is to provide in connection with a reactor an apparatus which is thoroughly reliable in operation and protected and sealed against the corrosive action of the chemicals being processed which will accurately reflect or duplicate the pressure within the reactor throughout variations therein to the end that the reflected pressure may be employed in connection with pressure control devices for use in connection with the reactor and the control of the processes being carried out therein.

Another object of my invention is to provide a means for maintaining the lubricant for the stuffing box of a reactor under a pressure above that of the reactor and supply the lubricant under a pressure such as always to maintain the lubricant in the stuffing box at a pressure higher than that existing in the reactor whereby leakage of gases or liquids out of the reactor is prevented and any leakage which occurs from the stuffing box is lubricant.

Another object of my invention is to provide a method and means for lubricating the stuffing box of an agitator shaft for a reactor in which the pressure of lubricants supplied to the stuffing box is always maintained above that of the reactor regardless of variations in pressure conditions within the reactor.

Still another object of my invention is to provide a means for lubricating and sealing the stuffing box of the agitator which may be used when the reactor is operated under vacuum conditions.

A further object of my invention is to provide a novel counterbalance diaphragm and valve which is sensitive to fluctuations in pressure within the reactor and which may be arranged so as to maintain when desired a substantially constant overpressure above the pressure existing in the reactor regardless of whether the pressure within the reactor is constant, rising or falling; which is adjustable, when desired, to equal, be higher or lower than the pressure within the reactor; or which when the reactor is operated under vacuum conditions may be set so as to carry, if desired, either a predetermined pressure under that of the reactor, or over that prevailing in the reactor.

My invention further contemplates the provision of a method and apparatus for supplying a lubricant to the stuffing box of the agitator shaft of a reactor wherein a source of fluid under pressure higher than the maximum pressure likely to be carried in the reactor is supplied to a counterbalance diaphragm assembly which includes a leakage valve arranged so that the pressure from the external source is modified so as to duplicate or reflect the pressure in the reactor, the valve being capable of being set so that the duplicated or reflected pressure is modified and normally is somewhat higher than the pressure within the reactor, such external source of fluid under pressure at the counterbalancing or overpressure being supplied to a lubricant reservoir to maintain the pressure therein above that of the reactor by the predetermined amount whereby the lubricant pressure supplied to the stuffing box is always normally slightly in excess of the pressure within the reactor to the end that the stuffing box is sealed against egress of gases from the reactor and adequate lubrication of the stuffing box is accomplished.

Other objects and advantages of my invention will be set forth in the claims and will be apparent from the following description, when taken in connection with the accompanying drawings, in which:

Fig. 1 is a view largely diagrammatic showing the general arrangement of the apparatus of my invention for carrying out my novel method of lubricating and sealing the stuffing box of a reactor;

Fig. 2 is a sectional view showing the counterbalance diaphragm valve, the diaphragm and associated parts;

Fig. 3 is a top plan view of Fig. 2;

Fig. 4 is a sectional view taken substantially on the line 4—4 of Fig. 2 in the direction indicated by the arrows; and Fig. 5 is a sectional view taken substantially on the line 5—5 of Fig. 2 in the direction indicated by the arrows.

In the drawings, I have indicated a reactor 11 suitable for carrying out chemical reactions at high pressures. For example, the pressures in the reactor may be carried up to 300 pounds per square inch. However, the particular pressure at which the reactor is operated is not critical. The apparatus shown is suitable for use in processes wherein the pressure fluctuates or rises and falls or where subatmospheric pressure conditions exist in the reactor during the carrying out of the process.

The counterbalance valve and diaphragm of my invention may be employed in connection with various pressure actuated devices, as previously mentioned, which are to be controlled in accordance with pressures existent in the reactor and where it is necessary or desirable to maintain the valve and associated parts sealed from contact with the gases or liquids in the reactor.

For purposes of illustrating one application of the invention and not by way of limitation, I will describe the counterbalance diaphragm and valve of my invention as it may be employed in lubricating the stuffing box of a reactor. Extending through an opening 12 provided in the reactor is an agitator shaft 13 which as well known in the art to which this invention applies, is rotated and has agitator blades mounted on the lower end thereof suitable for constantly stirring the product as the reaction is carried out. The agitator shaft is provided with suitable bearings (not shown) and a stuffing box 14 which may be of any conventional design.

As previously mentioned, in the case of some chemical reactions it is essential that gases or liquids be prevented from escaping from the reactor around the agitator shaft and through the stuffing box. At the high pressures at which some reactions are carried out, this is an extremely difficult problem. Moreover, the lubrication of the stuffing box also presents a pressing problem under these pressure conditions. The packing employed is no part of my present invention, the choice of packing being to a large extent governed by the chemicals being processed. Moreover, since the stuffing box per se constitutes no part of my invention, it will not further be described except to state that a number of types of stuffing boxes well known in the art to which this invention applies may be employed.

Lubricant is supplied to the stuffing box through a pipe 16 which communicates with a bore 17, lubrication chambers in the interior of the stuffing box and is connected to a pipe 18 which is provided with a suitable shut-off valve 19. The pipes 16 and 18 are connected together by a T 21, one arm of the T extending to a shut-off valve 22 which connects with an emergency lubrication coupling 23 as is well known in the art. The coupling is adapted to receive a lubricant pressure pump.

In normal operation, lubricant is supplied through pipe 18 from a lubricant reservoir 23 which is normally maintained under pressure, as will be presently described. The reservoir may be equipped with a liquid level gauge, indicated by the numeral 24, which connects with passages (not shown) in the lubricant reservoir and is provided with valves 26 for the purpose of cutting out the gauge when desired. As indicated in the drawings, the level of the liquid in the reservoir is shown in a sight glass 27.

The lubricant reservoir is provided with suitable means, indicated by the numeral 28, for refilling the reservoir with liquid and with a gauge 29 by which the pressure of lubricant in the reservoir which is in the same relationship as the reactor pressure may be read.

A gas supply tube 31 is connected into the lubricant reservoir by means of a T 32 and suitable fittings, and the other end of the gas supply tube is connected by suitable fittings and a T 33 to a pipe 34.

The pipe 34 is connected to any suitable source of gas under pressure. The gas employed is preferably an inert gas which has no harmful effects if it escapes into the room, if it is somewhat absorbed by the lubricant and does not require the use of special chemical resistant metals. The source of the inert gas should be under a pressure substantially higher than any pressure contemplated for use in the reactor. The pipe 34 is provided with a shut-off valve 36 and a needle valve 37 by which the flow of the inert gas may be cut off entirely as by the valve 36; or when the valve 36 is open, the quantity of gas supplied through the pipe 34 may be regulated accurately by the needle valve 37.

The reactor is provided with a second opening 38 (Fig. 2) which has a flange 39 provided with suitable bolt openings 41. A housing or valve body generally indicated by the numeral 42, is provided with suitable bolt openings 43 which in cooperation with the bolt openings 41 are adapted to receive bolts for clamping the valve body with respect to the flange 39 of the reactor.

The valve body 42 is provided with a cylindrical recess 44 which merges with an annular recess 46 in which an O ring of packing 47 is seated. Located in the cylindrical recess 44 is a diaphragm stop 48 and superimposed above that, a diaphragm 49. Interposed between the diaphragm stop 48 and the diaphragm 49 is a disk or diaphragm shield 51 of preferably plastic material which is impervious to the chemicals being processed in the reactor. A material suitable for this purpose is known under the trade name "Teflon." The use of a backing plate or diaphragm stop is desirable primarily with high pressures. In connection with the processing of some materials as, for example, strong acids such as hydrochloric acid or such chemicals as chlorine, the diaphragm stop should be omitted. When handling strong acids a glass lined reactor may be employed and the diaphragm stop omitted. The diaphragm stop 48 is primarily to prevent injury to the diaphragm with sudden fluctuations in pressure.

Extending in surrounding relation to the diaphragm stop 48 is an annular gasket 52 which when the valve body is secured in position by the bolts previously mentioned, seals the parts against leakage of gases from the reactor. The diaphragm stop 48 is provided with a series of openings 53 through which the pressure of gases in the reactor is exerted on the diaphragm shield 51 and hence on the diaphragm 49. A diaphragm stop disk 54 is mounted in a cavity 56 provided in the valve body 42 and rests upon the diaphragm 49. The diaphragm stop disk 54 is provided with a plurality of apertures 57 which communicate with a diaphragm or counterbalance chamber 58 and with an annular recess 59.

The end of the pipe 34 through a fitting 61 threaded into the valve body 42, as indicated by the numeral 62, communicates through suitable connections with the annular recess 59. These connections include a bore 63 which connects with a member 64 having a restricted passage 65. The restricted passage 65 serves to prevent a large rush of gas at high pressure into the diaphragm chamber 58 likely to cause injury to the diaphragm.

The valve body 42 has a bore 66 adapted to receive a sleeve 67. A valve stem 68 is mounted within the sleeve and has portions thereof 69 which engage but are movable with respect to the sleeve to aid in holding the valve stem in concentric relation with the sleeve. The enlarged portions 69 also provide a stop for a slide tension spring 71. A valve adjusting seat slide 72 has a shoulder 73 upon which the other end of the spring is seated. As will be clear from the drawing the valve seat slide 72 is free to slide or shift with respect to the valve stem 68 and the normal action of the spring 71 is to urge these two parts away from each other.

The valve stem 68 has a longitudinal bore 76 which communicates with a cross-bore 77, the ends of which communicate with a shell 79 which is suitably bored (Fig. 4) and provided with annular escape chambers, as indicated at 81, which communicate with a bore 82 connected with an escape outlet 83.

The shell 79 forming the escape chambers for the gas is sealed by suitable packing rings 86. The lower packing ring seats upon a packing washer 87 carried by a shoulder provided in the sleeve 67. The bore 76 and its connections to the escape outlet 83 are of larger diameter or greater gas capacity than the capacity of the restricted inlet 65 so that when the outlet is unrestricted by the valve, presently to be described, gas may escape from the counterbalance chamber 58 more rapidly than it may enter through the restricted passage 65.

A packing gland 88 serves to hold the packing in position and is provided with suitable indica 89 (Fig. 3) for a purpose which will later appear. The packing gland 88 is threaded as shown at 90 for the reception of an adjusting screw 91. A turning rod 93 may be provided to facilitate the turning of the adjusting screw.

The lower end of the adjusting screw 91 is provided with a cone shaped recess 94 in which is seated a cone 96 formed at the top of the valve stem 68. By this arrangement the screw 91 may be adjusted without misaligning the valve stem 68, the valve stem always seating in the cone shaped recess and being guided in the sleeve 67 by the enlarged portions 69 of the valve stem. Moreover, rotation of the adjusting screw does not rotate the valve stem 68 and the seat of the valve as will presently be clear.

Carried by the adjusting screw 91 is a pointer arm 98 which has a parting 99 (see Fig. 3). A cap screw 101 extends through the pointer arm and through the parting so that the pointer arm may be tightly clamped with respect to the adjusting screw so as to turn therewith.

A valve element or valve seat holder 102 has a recess formed therein for the reception of a valve seat or valve element of suitable material indicated by the numeral 103. The valve seat is adapted to cooperate and seal with an annular ring or valve seat 104 formed on the end of the valve stem 68. The valve element or seat holder 102 has a conical recess at the bottom thereof for the reception of the conical upper end 106 of a spring pivot element 107. The spring pivot element is normally urged in an upward direction by a spring 108, the lower end of which seats in a recess formed in a spring holder 109. The spring holder 109 is fixed with respect to the valve adjusting slide 72, being preferably threaded into the slide 72. The spring normally urges the seat holder 102 into engagement with the shoulder formed internally of the slide 72. The spring 108 limits the pressure which may be applied between the valve parts 103—104.

As shown in the drawings, the lower end of the valve adjusting slide 72 seats upon the diaphragm 49 being normally urged into engagement therewith by the slide tension spring 71. Thus the pressure of the spring is applied on the diaphragm partially to counterbalance the pressure of gas within the reactor.

It will be particularly noted that the spring 71 normally retains the valve 103—104 open so as to permit the free escape of gas from the counterbalance chamber 58. When the pressure in the reactor builds up the slide 72 moves upward to allow the valve parts to seat, a clearance being provided above the slide as indicated in the drawings. The seating pressure is never excessive as it is limited by the pressure of the spring 108 even though there may be a sudden and wide fluctuation in the pressure within the reactor. For this reason and also because the valve is always in the same position excessive wear is avoided. The spherical seat holder also aids in preserving the proper functioning of the seat since this insures the proper alignment of the valve parts during and prior to seating.

When the apparatus is in operation the needle valve 37 is opened to admit a flow of gas through the pipe 34 and connections 62, 65 and 63 and bores 57 to the counterbalance chamber 58. So long as the valve 103—104 is open, this flow of gas escapes through the escape port 83. However, when the pressure within the reactor rises the valve closes restricting the escape of gas, making the counterbalancing pressure or a reflected pressure available in the counterbalance chamber. As the pressure in back of the diaphragm rises it is exerted on the diaphragm causing the slide to move downward under the action of spring 71 until it is sufficient to open the valve 103—104. A leakage of gas then occurs through passages 76 and 77 into the escape chambers formed around the shell 79. This escaping gas flows through the outlet 82 to atmosphere which may be connected, if desired, to a bubbler for visual observation of the amount of gas escaping. The objective is to establish a condition of equilibrium in which the pressure on the external side will reflect the pressure within the reactor or be a fixed amount higher or lower than that pressure. In cases where the pressure within the reactor is rising or falling, the external side of the reactor should rapidly follow such rising or falling pressures and again stabilize when the reactor pressure stabilizes.

To avoid wastage of gas it is desirable to adjust the needle valve 37 so that the amount of gas escaping is a minimum. That is, for any particular pressure in the reactor, the valve and diaphragm reach a state of equilibrium in which a slight leakage of gas is occurring through the escape port and the amount of this escaping gas can be regulated by the needle valve. This adjustment of the needle valve is not critical to secure the counterbalancing conditions desired but there should always be some leakage to insure proper counterbalancing.

It will now be apparent that the pressure in the counterbalance chamber 58 normally is the same pressure as the pressure of gas in the tubing 31 flowing to the lubricant reservoir 23. However, there may be some variation from this normal condition due to the restriction 65. Thus, for example, when the pressure within the reactor is dropping the valve 103—104 moves to a more open position allowing the gas to escape from the diaphragm chamber and reduce the pressure therein. Under such condition the pressure in the tube 31 may be higher than in the diaphragm chamber. However, the pressure in the lubricant reservoir is always above that existing in the reactor, when the reactor is operating at positive pressures. While there will be some time lag due to the restriction 65, equilibrium will be quickly established. Thus, the pressure of lubricant on the stuffing box is the reactor pressure plus the overpressure of the inert gas in the counterbalance chamber and in addition the hydrostatic pressure determined by the higher level of the liquid in the lubricant reservoir with respect to the level of the stuffing box. Even though the overpressure or the pressure in the counterbalance chamber is the same as that existing in the reactor, this constant hydrostatic pressure above that of the reactor is always available on the stuffing box regardless of operating conditions. Thus sealing and lubrication of the stuffing box is assured.

When it is desired to vary or change the overpressure carried in the diaphragm counterbalancing chamber to a different pressure from the pressure at which the apparatus is set, the adjusting screw 91 is adjusted to a plus position from the zero position indicated in Fig. 3. Rotation of the screw in a clockwise direction or towards the plus side shown in Fig. 3 moves the valve stem 68 downward thereby adjusting the pressure on the slide tension spring 71, thereby increasing the differential pressure or overpressure normally carried in the lubricant reservoir. Conversely moving the screw 91 in a counterclockwise direction, as viewed in Fig. 3, decreases the pressure on the slide tensioning spring thereby decreasing the amount of pressure on the lubricant in the lubricant reservoir. By adjusting the screw 91 to the proper position the counterbalance system may be arranged to exert a pressure on the lubricant less than the reactor pressure. Such adjustment may be desirable when a subatmospheric pressure is being carried in the reactor. When operating under vacuum conditions the gas escape 83 may be connected to a vacuum pump or the same pump employed to exhaust the reactor.

In the drawings I have shown a pressure gauge 116 which is connected to the counterbalance chamber 58. By means of this gauge it is possible to determine when the proper amount of gas is being fed to the counterbalance chamber. Opening the needle valve 37 only slightly will immediately raise the counterbalance pressure if there was not enough gas being fed. When the counterbalance point is reached the rise of the needle on the gauge will stop even with an increase in the amount of gas flow.

In connection with the operation of pressure actuated devices employed in connection with the control of the reactor such pressure actuated devices may be connected into the line 31 so that they will be actuated responsive to conditions within the reactor. While I have employed the terms "counterbalance pressure" and "reflected pressure," it will be understood that the pressure on the external side of the diaphragm is not necessarily the same as the pressure within the reactor. It may be above or below that pressure and this should be understood when these terms are employed in the claims.

While I have shown and described the preferred counterbalance diaphragm and valve of my invention and described one of its applications, it will be apparent that it has other applications and that various changes may be made particularly in the form and relation of parts without departing from the spirit of my invention as set forth in the appended claims.

I claim:

1. In a reactor wherein an agitator shaft extends into the reactor and is provided with a stuffing box, in combination, a chamber containing a lubricant under pressure, means for supplying lubricant from said chamber under a pressure above atmospheric to the stuffing box, means for maintaining the lubricant under a pressure above that of the reactor comprising a diaphragm exposed on one of its sides to reactor pressure and on its other side to a counterbalance pressure above that of the reactor, said latter means including a source of inert fluid under a pressure above that of the reactor, and means including a connection between said other side of the diaphragm and said chamber for exposing the lubricant in said chamber to said counterbalance pressure.

2. In a reactor wherein an agitator shaft extends into the reactor and is provided with a stuffing box, in combination, a chamber containing a lubricant under pressure, means for supplying lubricant from said chamber to the stuffing box, means for maintaining the lubricant under a pressure comprising a diaphragm exposed on one of its sides to reactor pressure and on its other side to a pressure above that of the reactor, said latter means including a source of fluid other than the lubricant under a pressure above that of the reactor, means for regulating the flow of fluid from said source to said other side of the diaphragm, and means including a connection between said other side of the diaphragm and said chamber for exposing the lubricant in said chamber to said latter pressure.

3. In a reactor wherein an agitator shaft extends into the reactor and is provided with a stuffing box, in combination, a chamber containing a lubricant under pressure, means for supplying lubricant from said chamber to the stuffing box, means for maintaining the lubricant under a pressure comprising a diaphragm exposed on one of its sides to reactor pressure and on its other side to a counterbalance pressure above that of the reactor, said latter means including a source of fluid under a pressure above that of the reactor, means for regulating the flow of fluid from said source to said other side of the diaphragm, a valve for enabling escape of fluid from said other side of the diaphragm, said valve being controlled by the position of said diaphragm as its position fluctuates in response to variations in the differential in pressure on opposite sides of the diaphragm, and means including a connection between said other side of the diaphragm and said chamber for exposing the lubricant in said chamber to said counterbalance pressure.

4. In a reactor wherein an agitator shaft extends into the reactor and is provided with a stuffing box, in combination, a chamber containing a lubricant under pressure, means for supplying lubricant from said chamber to the stuffing box, said chamber being located above the stuffing box to maintain at least a minimum hydrostatic pressure of lubricant on the stuffing box above that of the reactor, means for maintaining the lubricant under a pressure above that of the reactor comprising a diaphragm exposed on one of its sides to reactor pressure and on its other side to a pressure above that of the reactor, said latter means including a source of fluid under a pressure above that of the reactor, means for regulating the flow of fluid from said source to said other side of the diaphragm, and means including a connection between said other side of the diaphragm and said chamber for exposing the lubricant in said chamber to said latter pressure.

5. A method of sealing and lubricating the stuffing box of a shaft extending into a reactor which comprises counterbalancing the pressure within a reactor by the pressure of a fluid from an external source, exposing the lubricant to said counterbalancing pressure, and maintaining a hydrostatic head of lubricant on said stuffing box which when added to the counterbalancing pressure maintains a seal at the stuffing box against the escape of fluid from said reactor around the shaft.

6. A method of sealing and lubricating the stuffing box of a shaft extending into a reactor which comprises overbalancing the pressure within a reactor by a controlled pressure of an inert gas from an external source, exposing the lubricant to said overbalancing pressure, and maintaining a hydrostatic head of lubricant on said stuffing box which when added to the overbalancing pressure maintains a seal at the stuffing box against the escape of fluid from said reactor around the shaft.

7. A combined counterbalancing device and valve for use in connection with a reactor comprising, in combination, a diaphragm exposed on one side to the pressure within the reactor, a counterbalance chamber on the other side of the diaphragm to which a source of fluid under pressure has access, a valve comprising a valve element and a seat for controlling the escape of fluid from said counterbalance chamber, means normally urging said valve toward an open position against the pressure within the reactor, and means normally holding said valve element in alignment with its seat and limiting the pressure between said valve element and its seat when the valve is closed to a substantially constant valve regardless of pressure conditions in the reactor.

8. A combined counterbalancing device and valve for use in connection with a reactor comprising, in combination, a diaphragm exposed on one side to the pressure within the reactor, a counterbalance chamber on the other side of the diaphragm to which a source of fluid under pressure has access, a valve comprising a valve element and a seat for controlling the escape of fluid from said counterbalance chamber, pressure means normally urging said valve toward an open position against the pressure within the reactor, means normally holding said valve element in alignment with its seat and limiting the pressure between the valve and its seat when the valve is closed to a substantially constant valve regardless of pressure conditions in the reactor, and means for adjusting the pressure of said pressure means without rotating the valve or its seat.

9. A combined counterbalancing device and valve for use in connection with a reactor comprising, in combination, a diaphragm exposed on one side to the pressure within the reactor, a restricted inlet, a counterbalance chamber on the other side of the diaphragm to which a source of fluid under pressure has access through said restricted inlet, a valve comprising a valve element and a seat for controlling the escape of fluid from said counterbalance chamber, escape ports on the discharge side of said valve of large cross-sectional area than said restricted inlet, means normally urging said valve toward an open position against the pressure within the reactor, and means normally holding said valve element in alignment with and limiting the pressure between the valve element and its seat when the valve is closed to a substantially constant valve regardless of pressure conditions within the reactor.

10. Apparatus for lubricating and sealing the stuffing box of an agitator shaft for a reactor comprising, in combination, a lubricant reservoir for supplying lubricant to said stuffing box under a pressure approximating that of the pressure of the reactor, a diaphragm exposed on one of its sides to reactor pressure and on its other side to a fluid from an external source at a pressure higher than that of the reactor, a connection between said other side of said diahpragm and the lubricant reservoir whereby the pressure on said other side of the diaphragm is substantially the same as that applied on the surface of the lubricant in the reservoir, and a valve controlled at least partly by the differential in pressure across the diaphragm for enabling the escape of said fluid from said other side of the diaphragm and externally of the apparatus when the pressure on said other side of the diaphragm rises above a desired level.

11. Apparatus in accordance with claim 10 wherein the fluid is an inert gas and the pressure at which said valve will open to enable escape of said gas may be varied to maintain the pressure on the lubricant at predetermined value with respect to the pressure within the reactor.

12. Apparatus in accordance with claim 10 wherein the lubricant reservoir is above the reactor so that if the fluid pressure on the lubricant is the same as the reactor pressure a predetermined hydrostatic pressure will be applied on said stuffing box.

13. Apparatus in accordance with claim 10 wherein the pressure at which said valve will open to enable escape of fluid may be varied but when adjusted to obtain a predetermined ratio of the pressure on the lubricant in the reservoir with respect to reactor pressure, the valve will open and close automatically to maintain that ratio approximately constant with fluctuations in reactor pressure.

References Cited in the file of this patent

UNITED STATES PATENTS

| | | |
|---|---|---|
| 1,293,178 | Osborne | Feb. 4, 1919 |
| 1,786,844 | Hesselman | Dec. 30, 1930 |
| 1,855,505 | Wilson | Apr. 26, 1932 |
| 2,291,248 | Myers | July 28, 1942 |
| 2,418,620 | Brumagim | Apr. 8, 1947 |
| 2,427,656 | Blom | Sept. 23, 1947 |
| 2,517,534 | Courtot | Aug. 8, 1950 |